US00RE43195E

(19) United States
(12) Reissued Patent
Cotton

(10) Patent Number: US RE43,195 E
(45) Date of Reissued Patent: Feb. 21, 2012

(54) FOOT DRESSING

(75) Inventor: Stephen Cotton, Papplewick (GB)

(73) Assignee: Brightwake, Ltd., Nottinghamshire (GB)

() Term: 14 Years**

(21) Appl. No.: 29/378,985

(22) Filed: Nov. 12, 2010

Related U.S. Patent Documents

Reissue of:
(64) Patent No.: Des. 620,122
Issued: Jul. 20, 2010
Appl. No.: 29/346,328
Filed: Oct. 30, 2009

(30) Foreign Application Priority Data

May 1, 2009 (EP) ..... 001133284

(51) LOC (9) Cl. ..... 24-04
(52) U.S. Cl. ..... D24/189
(58) Field of Classification Search ..... D24/189–192; 602/41–43, 48, 52, 54, 58
See application file for complete search history.

(56) References Cited

U.S. PATENT DOCUMENTS

| | | | | | |
|---|---|---|---|---|---|
| 2,858,731 | A | * | 11/1958 | Rehorn | 353/8 |
| 3,780,731 | A | * | 12/1973 | Quello | 602/36 |
| 3,989,041 | A | * | 11/1976 | Davies | 602/62 |
| 4,133,311 | A | * | 1/1979 | Karczewski | 602/65 |
| 4,360,015 | A | | 11/1982 | Mayer | |
| 4,401,113 | A | | 8/1983 | Incorvaia | |
| 4,494,536 | A | * | 1/1985 | Latenser | 128/882 |
| 4,500,315 | A | * | 2/1985 | Pieniak et al. | 604/379 |
| 4,537,590 | A | * | 8/1985 | Pieniak et al. | 604/379 |
| 4,699,823 | A | | 10/1987 | Kellenberger et al. | |
| 4,820,293 | A | | 4/1989 | Kamme | |
| 4,821,743 | A | * | 4/1989 | Wetz | 128/893 |
| D307,184 | S | * | 4/1990 | McConnell | D24/190 |
| 5,020,523 | A | * | 6/1991 | Bodine | 602/27 |
| 5,036,838 | A | * | 8/1991 | Sherman | 602/44 |
| 5,277,695 | A | * | 1/1994 | Johnson et al. | 602/14 |
| 5,609,570 | A | * | 3/1997 | Lamont | 602/65 |
| 6,090,059 | A | * | 7/2000 | Wasserman et al. | 602/27 |
| D474,842 | S | * | 5/2003 | Wolsing et al. | D24/189 |
| 6,558,363 | B2 | | 5/2003 | Keuhn, Jr. et al. | |
| D484,602 | S | * | 12/2003 | Griffiths et al. | D24/189 |
| D524,946 | S | * | 7/2006 | Shaw et al. | D24/189 |
| 7,091,394 | B2 | * | 8/2006 | Kolte et al. | 602/42 |
| 7,115,106 | B2 | * | 10/2006 | Bodenschatz et al. | 602/65 |
| D557,424 | S | * | 12/2007 | Knight | D24/189 |
| D575,874 | S | * | 8/2008 | Ormsby | D24/189 |
| D601,707 | S | * | 10/2009 | Chouiller | D24/189 |

FOREIGN PATENT DOCUMENTS

WO 2000-042957 A1 7/2000

* cited by examiner

*Primary Examiner* — Nanda Bondade
(74) *Attorney, Agent, or Firm* — Young Basile

(57) CLAIM

The ornamental design for a foot dressing, as shown and described.

DESCRIPTION

FIG. 1 is a front elevational view of a foot dressing in accordance with the invention;
FIG. 2 is a top view of the foot dressing of FIG. 1;
FIG. 3 is a bottom view of the foot dressing of FIG. 1;
FIG. 4 is a left side view of the foot dressing of FIG. 1, with a mirror image right side view omitted;
FIG. 5 is a rear view of the foot dressing of FIG. 1; and,
FIG. 6 is a front perspective view of the foot dressing of FIG. 1.

1 Claim, 4 Drawing Sheets

Figure 1:
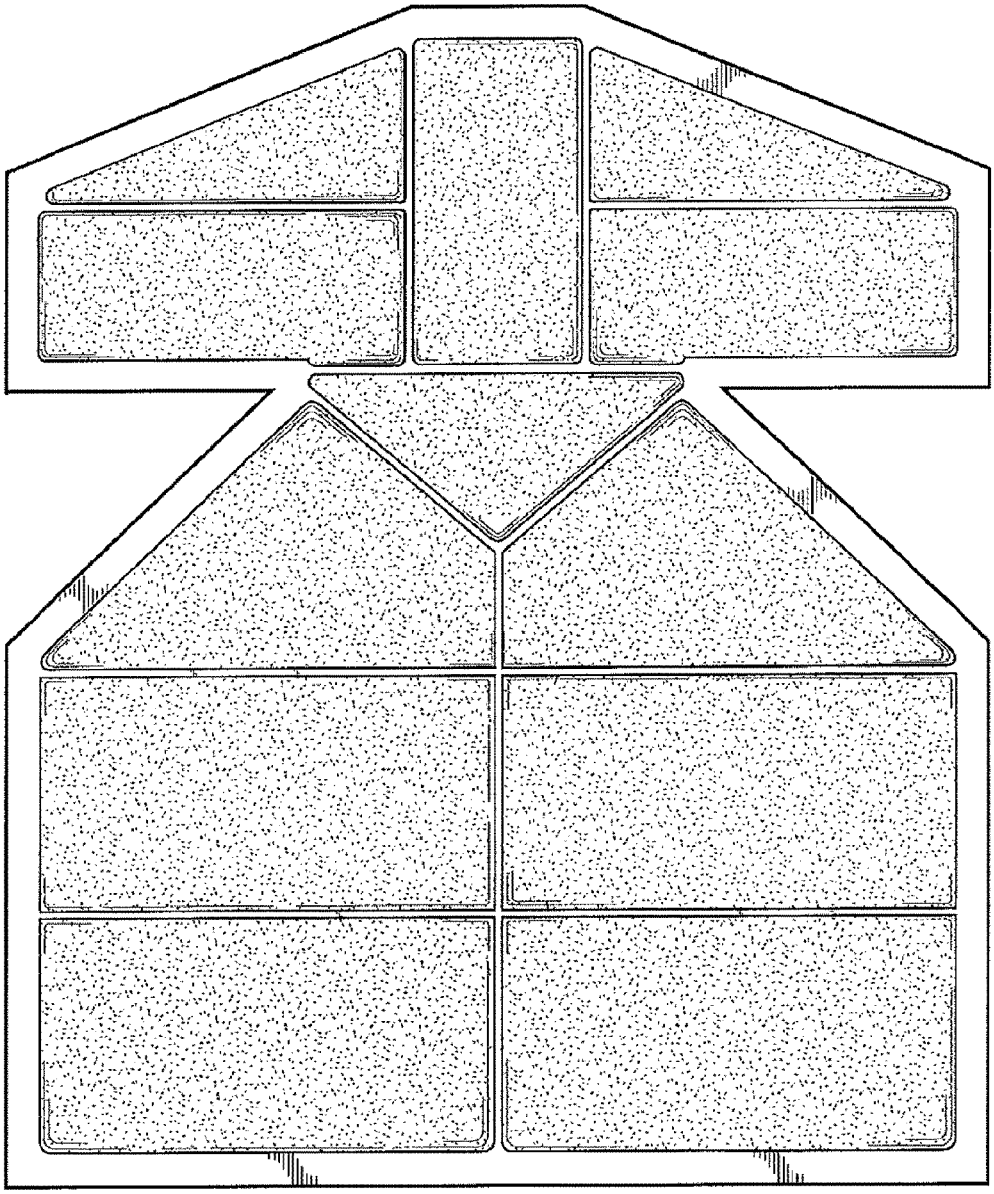
Figure 2:
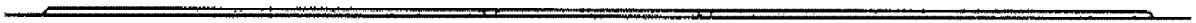
Figure 3:
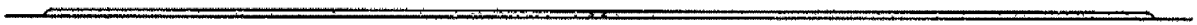
Figure 4:
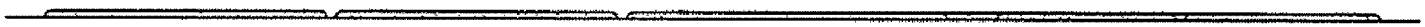
Figure 5:
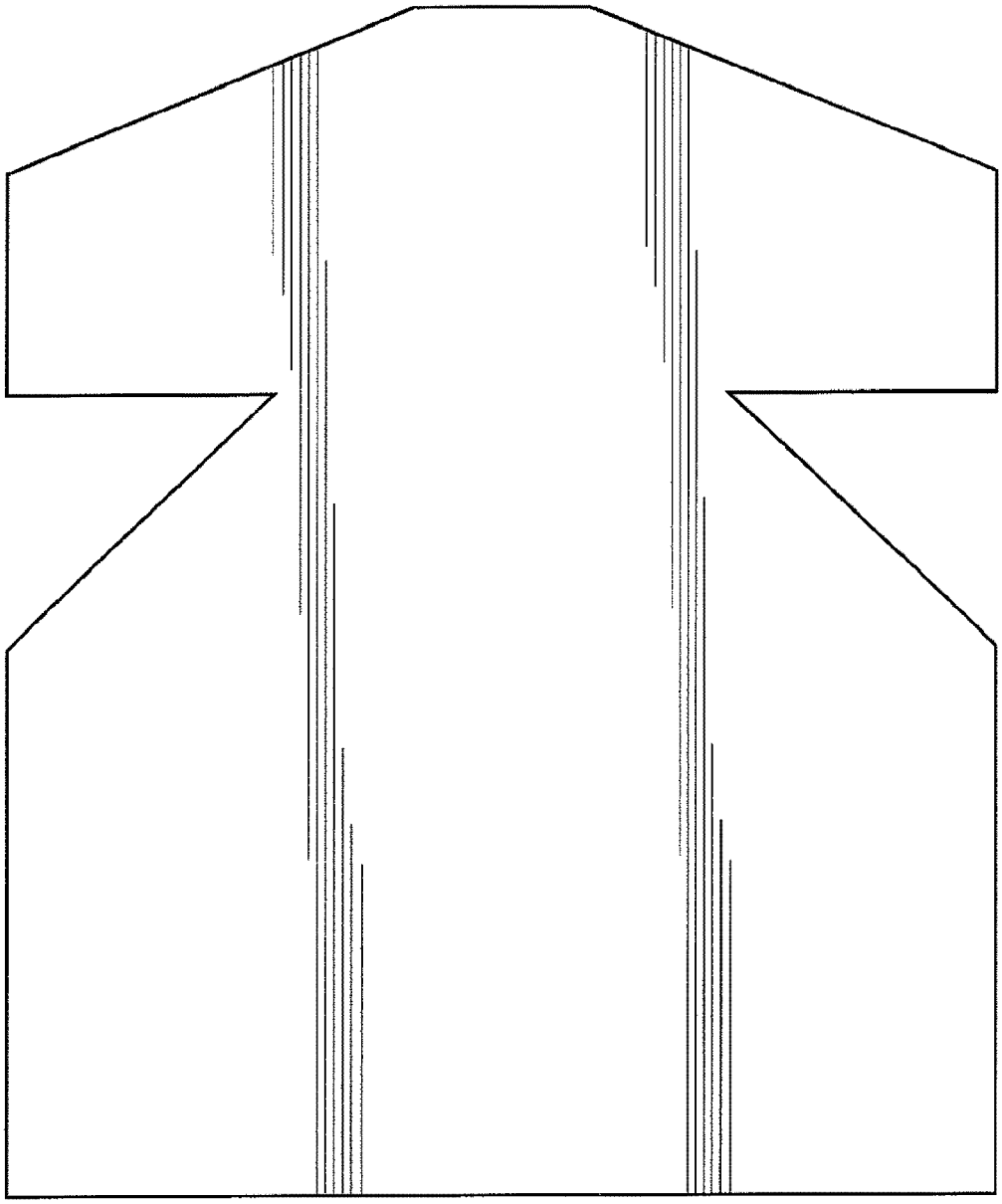
Figure 6:
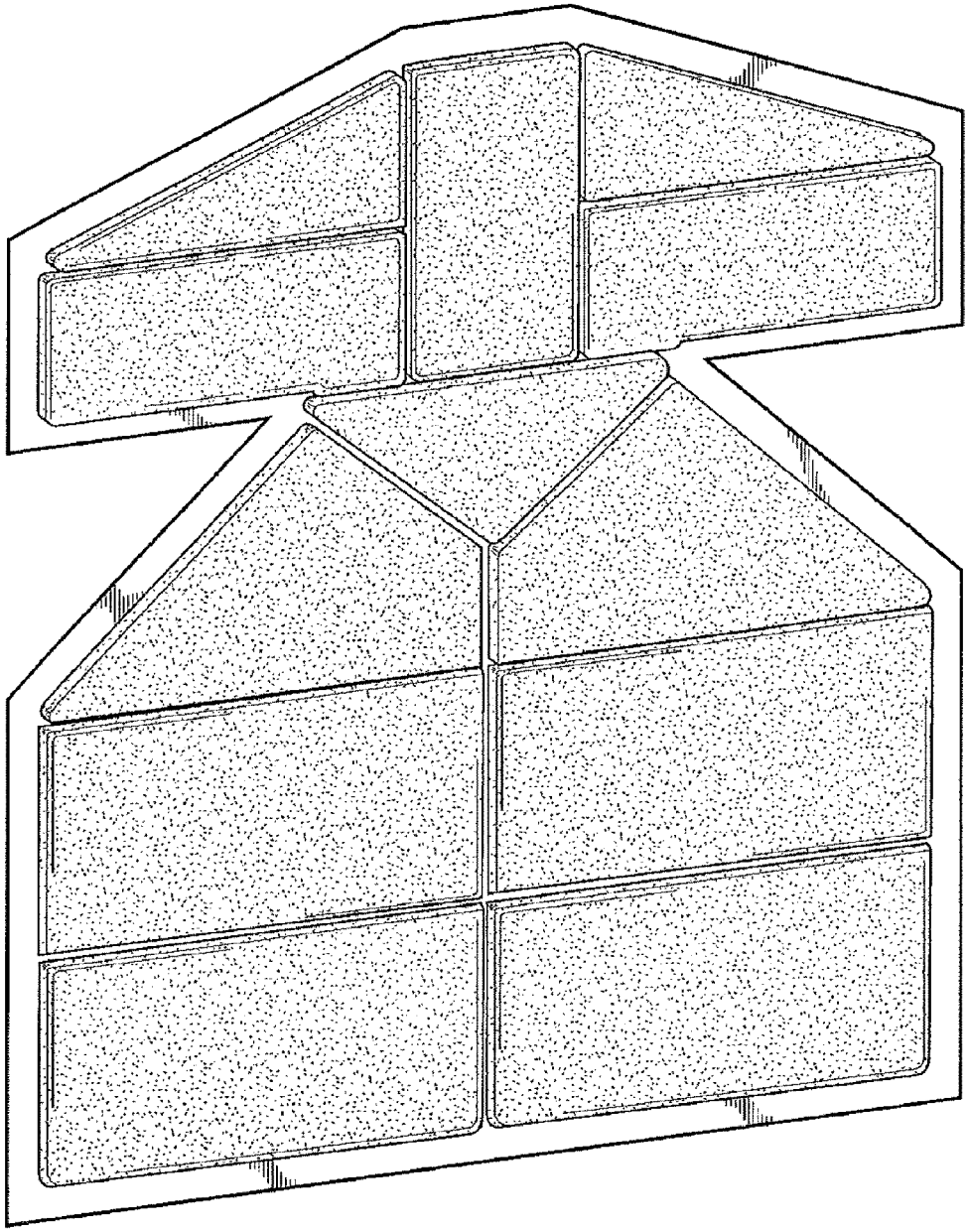

Matter enclosed in heavy brackets [ ] appears in the original patent, but forms no part of this reissue; matter printed in italics indicates the additions made by reissue.